United States Patent [19]

David et al.

[11] Patent Number: 5,609,948
[45] Date of Patent: Mar. 11, 1997

[54] LAMINATE CONTAINING DIAMOND-LIKE CARBON AND THIN-FILM MAGNETIC HEAD ASSEMBLY FORMED THEREON

[75] Inventors: Moses M. David; Theodore A. Schwarz, both of Woodbury, Minn.

[73] Assignee: Minnesota Mining and Manufacturing Company, St. Paul, Minn.

[21] Appl. No.: 933,335

[22] Filed: Aug. 21, 1992

[51] Int. Cl.$^6$ .................................................. G11B 5/25
[52] U.S. Cl. ...................... 428/216; 360/103; 360/122; 428/336; 428/408; 428/698; 428/701; 428/702
[58] Field of Search .................................. 428/446, 408, 428/216, 698, 701, 702, 336, 325; 360/122, 103

[56] References Cited

U.S. PATENT DOCUMENTS

| Re. 32,464 | 7/1987 | Aine | 428/622 |
|---|---|---|---|
| 4,277,540 | 7/1981 | Aine | 428/627 |
| 4,302,790 | 11/1981 | Lemke | 360/119 |
| 4,647,494 | 3/1987 | Megerson et al. | 428/216 |
| 4,650,774 | 3/1987 | Kawaguchi et al. | 501/87 |
| 4,849,290 | 7/1989 | Fujimori et al. | 428/408 |
| 5,050,027 | 9/1991 | Meunier et al. | 360/122 |
| 5,055,318 | 10/1991 | Deutchman et al. | 427/38 |
| 5,083,365 | 1/1992 | Matsumoto | 360/122 |
| 5,159,508 | 10/1992 | Grill et al. | 360/103 |
| 5,190,823 | 3/1993 | Anthony et al. | 428/408 |

FOREIGN PATENT DOCUMENTS

| 62-033317 | 2/1987 | Japan . |
|---|---|---|
| 3268210 | 11/1991 | Japan . |

OTHER PUBLICATIONS

Chemical Abstracts No. 54464g, *Chemical Abstracts*, vol. 117, No. 6, Aug. 10, 1992, p. 370.
Chemical Abstracts No. 54594z, *Chemical Abstracts*, vol. 117, No. 6, Aug. 10, 1992, p. 377.
Angus, John C. and Cliff C. Hayman, "Low–Pressure, Metastable Growth of Diamond and 'Diamondlike' Phases," Articles, Aug. 19, 1988, pp. 913–921.
Bhushan, Bharat, *Tribology and Mechanics of Magnetic Storage Devices*, pp. 1–41.
Davanloo, F. et al., "Adhesion and Mechanical Properties of Amorphic Diamond Films Prepared By a Laser Plasma Discharge Source," 71(3) *Journal of Applied Physics*, Feb. 3, 1992, pp. 1446–1453.
Grill, A., B. S. Meyerson, and V. Patel, "Adhesion and Wear Behavior of Diamond Like Carbon Films Prepared by RF Plasma" from Diamond and Diamond–like Material Synthesis Symposium, Material Research Society, Apr. 5–9, 1988, pp. 85–88.
Hsiao–chu Tsai and D. B. Bogy, "Characterization of Diamondlike Carbon films and their application as overcoats on thinfilm media for magnetic recording," *J. Vac. Sci. Technol.* A5(6), Nov./Dec. 1987, pp. 3287–3312.
Mee, D. Denis and Eric D. Daniel, editors, *Magnetic Recording Handbook*, (New York: McGraw Hill Publishing Co., 1989) pp. 290–295 and p. 940.

(List continued on next page.)

*Primary Examiner*—Archene Turner
*Attorney, Agent, or Firm*—Gary L. Griswold; Walter N. Kirn; Eric D. Levinson

[57] ABSTRACT

A wear-resistant thin-film magnetic head assembly and method of making same. The head assembly includes a wear-resistant layer of diamond-like carbon and a substrate of titanium carbide particles dispersed in an alumina matrix. Adhesion of the diamond-like carbon to the substrate is improved by depositing an adhesion promoting layer on the substrate. A second adhesion promoting layer can be deposited onto the diamond-like carbon layer to facilitate the deposition of electromagnetic circuitry on the diamond-like carbon layer. Diamond-like carbon can be used as an insulator anywhere inside the head assembly. The present invention simplifies the construction of a head assembly and increases its resistance to wear by moving magnetic media.

13 Claims, 3 Drawing Sheets

OTHER PUBLICATIONS

Meunier, P.L., F. LeTexier, J.M. Coutellier, and J.M. Mackowski, "Improvement of the Wear Resistance of Magnetic and Vitreous Substrates Coated with Thin Diamond Like Carbon Layers," *Mat. Res. Soc. Symp. Proc.*, vol. 140, 1989, pp. 509–516.

Moses, David, Raghunath Padiyath, and Suryadevara V. Babu, "Plasma Deposition and Etching of Diamond–Like Carbon Films," *A.I.Ch.E. Journal*, vol.37, No. 3, Mar. 1991, pp. 367–376.

Romankiw, Lubomyr T. and Dean A. Herman Jr., editors, "Proceedings of the Symposium on Magnetic Materials, Processes, and Devices," Electrodeposition Division, Proceedings vol. 90-8 (Pennington, NJ: The Electrochemical Society, Inc. 1990), pp. 185–204.

Zehringer, R., R. Havert, and M. Tobler, "Interface Studies of Hydrogenated Carbon Films on Amorphous Zirconium Alloys," *Thin Solid Films*, 208 (1992) pp. 38–41.

5,609,948

LAMINATE CONTAINING DIAMOND-LIKE CARBON AND THIN-FILM MAGNETIC HEAD ASSEMBLY FORMED THEREON

FIELD OF THE INVENTION

The present invention concerns an improved thin-film magnetic head assembly.

BACKGROUND OF THE INVENTION

The amount of data that can be stored on magnetic media, e.g., tapes or discs, can be increased by increasing the bit and track density of the magnetic media. This in turn requires magnetic heads that are capable of reading and writing at these increased bit and track densities. One such head is a thin-film head.

Thin-film heads, however, are highly sensitive to wear caused by contact between the head and the moving magnetic media. This wear causes a washing out or dishing of the center of the head surface, resulting in decreased accuracy of the head during reading and writing. While the larger ferrite heads can generally withstand as much as 50 μm of wear, the smaller thin-film heads can tolerate only about 1–2 μm of wear before their accuracy during reading and writing is affected.

Future generations of thin-film heads may place the read and write functions in the same physical gap to reduce alignment tolerances and thereby achieve greater track densities. This would exacerbate the problems caused by wear of the head.

The manufacture of thin-film magnetic recording heads typically begins with a ceramic substrate comprised of an $Al_2O_3$-TiC composite monolithic wafer on which electromagnetic circuitry is deposited through a combination of sputter deposition, vapor deposition, electroplating, and photolithography. Each magnetic head element requires about ten square millimeters of substrate surface and therefore several hundred head elements can be formed simultaneously on a single substrate wafer. Other heads, known as micro and sub-micro heads, are substantially smaller so that several thousand such heads can be formed simultaneously on the wafer surface. After the transducers are formed on the substrate surface, the wafer is cut into the individual head elements, and precision lapped and polished to form the interface with the storage media. Typically, a 10–15 μm thick coating of non-conductive, amorphous aluminum oxide (a-$Al_2O_3$) is sputtered onto the substrate to provide electrical isolation prior to deposition of the transducer elements. This electrically insulating coating can require 10–15 hours to deposit using very expensive equipment, thereby adding substantially to the time and cost required to produce a magnetic head. The deposited a-$Al_2O_3$ layer must then be lapped back and polished to achieve the desired surface finish. The resultant a-$Al_2O_3$ coating is substantially softer than the $Al_2O_3$-TiC substrate and therefore wears at a faster rate causing poor head performance due to the recession of the coating and attached transducer elements.

It would be desirable to have a thin-film head assembly that was more resistant to wear by magnetic media and less expensive to make than currently available thin-film heads.

SUMMARY OF THE INVENTION

The present invention includes a laminated base for a thin-film magnetic head. This laminate includes a ceramic substrate comprising titanium carbide particles dispersed in an alumina matrix. An adhesion promoting layer comprising amorphous hydrogenated silicon carbide is provided on the substrate, and an insulative, wear-resistant layer comprising wear-resistant diamond-like carbon is provided on the adhesion promoting layer.

In one embodiment of the present invention, the laminate includes a second adhesion promoting layer provided on the wear-resistant layer. The second adhesion promoting layer is comprised of amorphous hydrogenated silicon and promotes the adhesion of a first film of a multi-layer thin-film magnetic head. As such additional layers are added, the present invention also becomes a thin-film magnetic head per se. In an alternative embodiment of the present invention, the first adhesion promoting layer can be amorphous silicon carbide, and the wear-resistant layer can be diamond or amorphous diamond.

The present invention also includes a method of forming such a laminate by depositing an adhesion promoting layer of amorphous hydrogenated silicon carbide onto a ceramic substrate of titanium carbide particles dispersed in an alumina matrix, and then depositing an insulative wear-resistant layer of diamond-like carbon onto the adhesion promoting layer.

In one embodiment of the method, a second adhesion promoting layer of amorphous hydrogenated silicon can be deposited onto the wear-resistant layer. Also, a layer of electromagnetic circuitry can be deposited onto the second adhesion promoting layer.

In another embodiment of the method, the step of depositing the wear-resistant layer is begun before the step of depositing the first adhesion promoting layer is completed, thereby forming a transition region between the two layers. The step of depositing the second adhesion promoting layer can also be begun before the step of depositing the wear-resistant layer is completed, thereby forming a transition region between those two layers.

The present invention also includes a thin-film magnetic head assembly having a substrate, a magnetoresistive (MR) sensor, magnetoresistive shields, write coils, write poles, and insulative layers, wherein the insulative layers are diamond-like carbon.

The insulative, wear-resistant layer of the present invention is substantially thinner than the insulative layers of known heads. While the insulative layers of known heads are often 10–15 μm thick, the insulative wear-resistant layers of the present invention are less than 5 μm thick, and are preferably about 1 μm thick. This decreases the amount of time required to deposit the insulative layers. Furthermore, while the amorphous alumina insulative layer used in known heads must be lapped back and polished to obtain the desired finish, the surface finish of the insulative, wear-resistant layer of the present invention is sufficient as deposited, thus avoiding the need for a lapping step.

The insulative wear-resistant layer of the present invention is substantially harder than amorphous alumina, and therefore helps to reduce wear on the head assembly caused by contact with the moving magnetic media (e.g., a disc or tape). The reduction in the width of the insulative layers decreases the size of the gap between the read and write functions of the head assembly, which reduces the area of the head assembly that is susceptible to wear, thereby increasing the wear-resistance of the head assembly.

DETAILED DESCRIPTION

Figure 1:
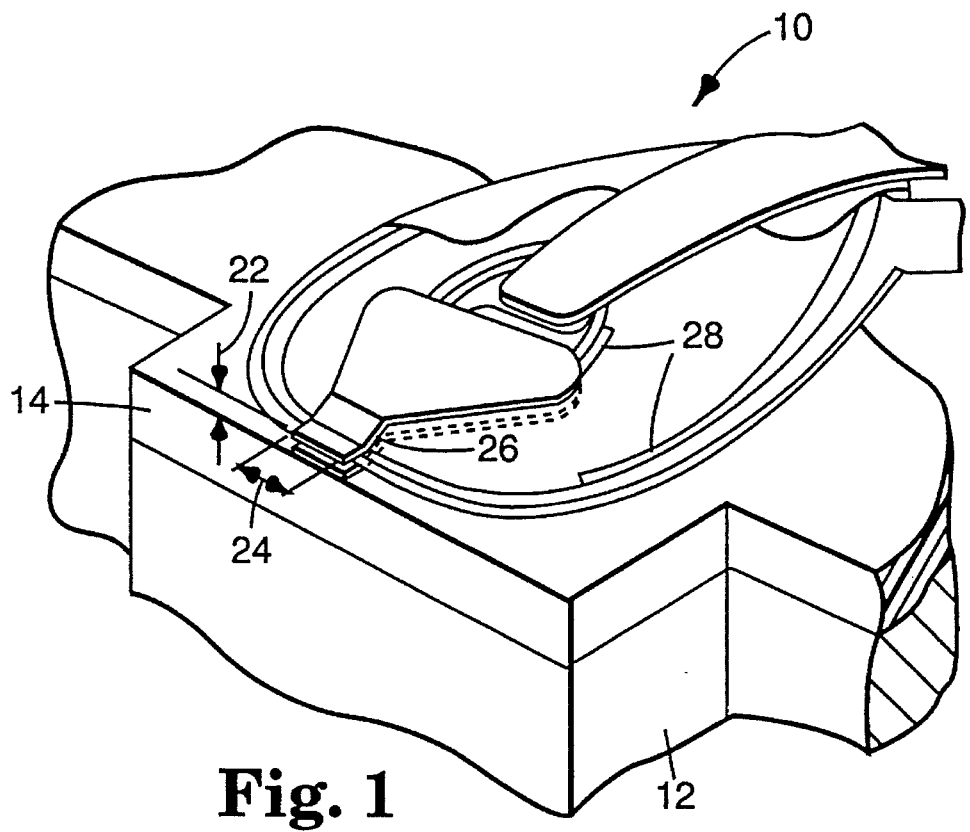
FIG. 1 is a perspective view of a prior art thin-film magnetic head.

A prior art magnetic recording head assembly 10 is shown in FIG. 1. The magnetic recording head assembly 10 is an inductive-type thin-film read-write element, such as the head used in an IBM 3370 disk head slider. The head assembly 10 is comprised of a substrate 12 which is covered with an insulative layer 14. The substrate 12 is $Al_2O_3$-TiC, which is a composite of titanium carbide particles dispersed in an alumina matrix. The insulative layer 14 is amorphous alumina (a-$Al_2O_3$), which has a Mohs hardness of about 7. The head assembly 10 typically has a gap length 22, a gap width 24, permalloy pole tips 26, and copper winding 28.

Figure 2:
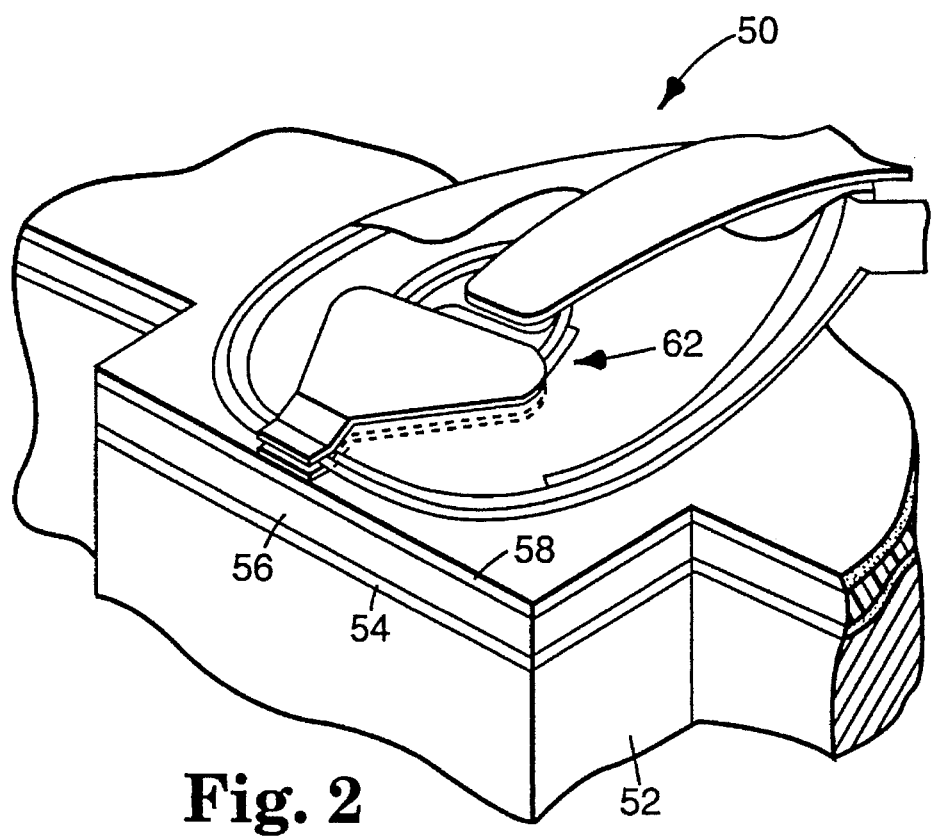
FIG. 2 is a perspective view of a thin-film magnetic head according to the present invention.

A magnetic recording head assembly having a substrate and insulative layer according to the present invention is shown as magnetic head assembly 50 in FIG. 2. A ceramic substrate 52 is comprised of $Al_2O_3$-TiC. An insulative, wear-resistant layer 56 comprising diamond-like carbon insulates electromagnetic circuitry 62 from the substrate 52. Diamond-like carbon ("DLC") is an amorphous form of carbon having a high degree of $sp^3$ bonding, so that the carbon material exhibits many of the physical characteristics of a diamond.

DLC films that are deposited directly on $Al_2O_3$-TiC substrates tend to buckle and delaminate, making such films undesirable for use in thin-film magnetic heads. The adhesion of the wear-resistant layer 56, and therefore its effective hardness, can be greatly improved by applying adhesion promoting layers above and below the wear-resistant layer. This is particularly true when a wear-resistant layer thickness of over 100 nm is desired. Accordingly, first and second adhesion promoting layers 54 and 58 are also included as shown in FIG. 2. The electromagnetic circuitry 62 is deposited onto the second adhesion promoting layer 58.

Figure 3:
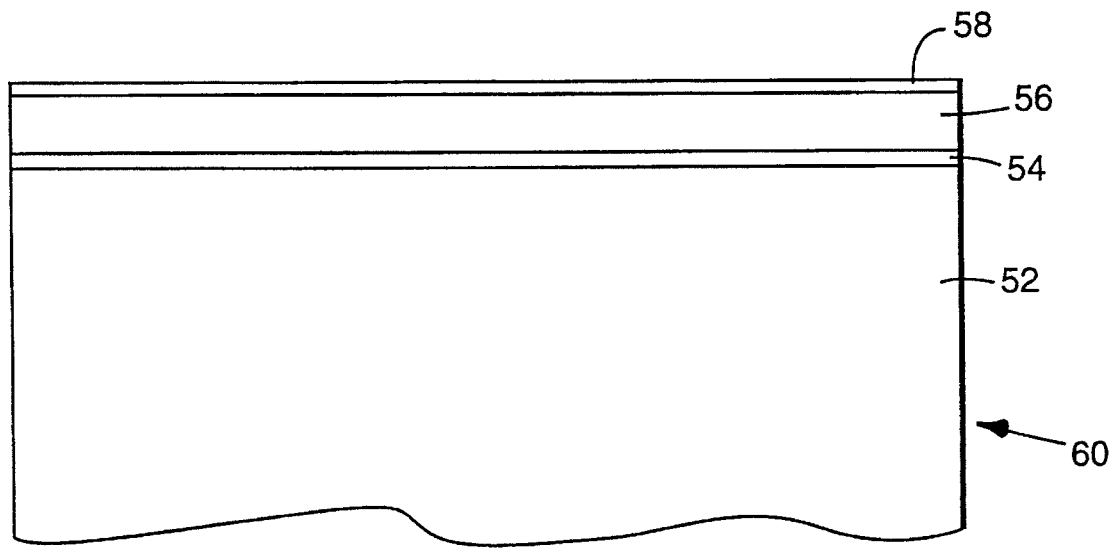
FIG. 3 is an enlarged view of a portion of the frontal view of FIG. 2.

A close-up view of the substrate 52 and the layers 54, 56, and 58 is shown as a laminated base 60 in FIG. 3. The substrate 52 is $Al_2O_3$-TiC, preferably having a titanium carbide particle loading within the range of from about 5 to 50% by weight. More preferably, the $Al_2O_3$-TiC substrate 52 has a titanium carbide particle loading within the range of from about 20 to 40% by weight, such as 3M Ceramic 210 which has a particle loading of about 30%, available from 3M Company, St. Paul, Minn. The first adhesion promoting layer 54 is deposited on the substrate 52. The first adhesion promoting layer 54 comprises amorphous hydrogenated silicon carbide (a-Si:C:H) and preferably has a thickness within the range of from about 1 nm to 100 nm, and more preferably from about 10 nm to 50 nm.

The insulative, wear-resistant layer 56 is deposited onto the first adhesion promoting layer 54. The wear-resistant layer 56 can comprise either amorphous carbon (a-C), amorphous hydrogenated carbon (a-C:H), or ion beam-deposited carbon (i-C), and preferably has a thickness within the range of from about 10 nm to 5 μm, and more preferably about 1 μm. In the alternative, a layer of diamond or amorphous diamond may be substituted for DLC in the wear-resistant layer 56.

The 1 μm thick, insulative, wear-resistant layer 56 is much thinner than the amorphous alumina insulative layers in known thin-film magnetic head assemblies, which are typically 10–15 μm in thickness. This decreases the amount of time required to deposit the insulative layer. Furthermore, the amorphous alumina in known heads must be lapped back to the desired thickness and surface finish. The degree of control of the resultant thickness and surface finish is limited by the ability to control the lapping operation. In contrast, the wear-resistant layer 56 deposited according to the present invention has an average surface roughness ($R_a$) of less than about 2 nm, which eliminates the need to polish the surface.

The first adhesion promoting layer 54 improves the effective hardness of the diamond-like carbon layer in the laminate. DLC deposited according to the above method has a Mohs hardness of 9, compared to 7 for amorphous alumina. In the context of a thin-film magnetic head assembly, the diamond-like carbon layer according to the present invention provides a hard, electrically insulative layer. It is believed that this hard insulative layer will improve the ability of a thin-film magnetic head assembly to withstand wear caused by repeated contact between the head assembly and the magnetic media it reads and writes on. The hard insulative layer may also help to reduce recession of the electromagnetic circuitry during the fabrication of a thin-film magnetic head, resulting in higher yields.

It is often desirable to be able to deposit further layers over the insulative, wear-resistant layer. This is particularly true in the case of a thin-film magnetic head assembly, where it is desirable to deposit electromagnetic circuitry making up the respective layers in the head assembly onto the insulative layer.

The second adhesion promoting layer 58 promotes adhesion between the wear-resistant layer 56 and further layers (not shown) in FIG. 3 which can optionally be applied. The second adhesion promoting layer 58 can comprise amorphous silicon (a-Si), and preferably comprises amorphous hydrogenated silicon (a-Si:H). The thickness of the layer 58 is preferably within the range of from about 1 nm to 100 nm, and more preferably from about 10 nm to 50 nm.

The adhesion between the first adhesion promoting layer 54 and the wear-resistant layer 56 can be enhanced during the deposition process by beginning the deposition of the wear-resistant layer before the deposition of the first adhesion promoting layer has been completed. This creates a transition region between the first adhesion promoting layer 54 and the wear-resistant layer 56 which is a blend of the two layers. Similarly, the adhesion between the wear-resistant layer 56 and the second adhesion promoting layer 58 can be enhanced by beginning the deposition of the second adhesion promoting layer before the deposition of the wear-resistant layer has been completed, thereby creating a second transition region.

The use of the second adhesion promoting layer 58 decreases the probability that the application of additional layers, such as metals and alloys, over the wear-resistant layer 56 will delaminate from the wear-resistant layer. This is particularly desirable in the construction of thin-film magnetic head assemblies, where the use of the second adhesion promoting layer 58 facilitates the adhesion of the electronic circuitry 62 to the wear-resistant layer 56. In such applications, it is desirable that the second adhesion promoting layer 58 be non-conductive. Accordingly, a-Si:H is preferred over a-Si:C:H as the second adhesion promoting layer 58. Amorphous hydrogenated silicon (a-Si:H) is preferred over a-Si:C:H as a second adhesion promoting layer because a-Si:H, unlike a-Si:C:H, is non-conductive. See FIG. 2.

While the method of the present invention, and the laminated base created thereby, has particular utility when used in thin-film magnetic heads, its potential use is not limited to that application. Rather, the present invention has utility wherever it is desirable to deposit a hard film on an $Al_2O_3$-TiC substrate.

Figure 5:
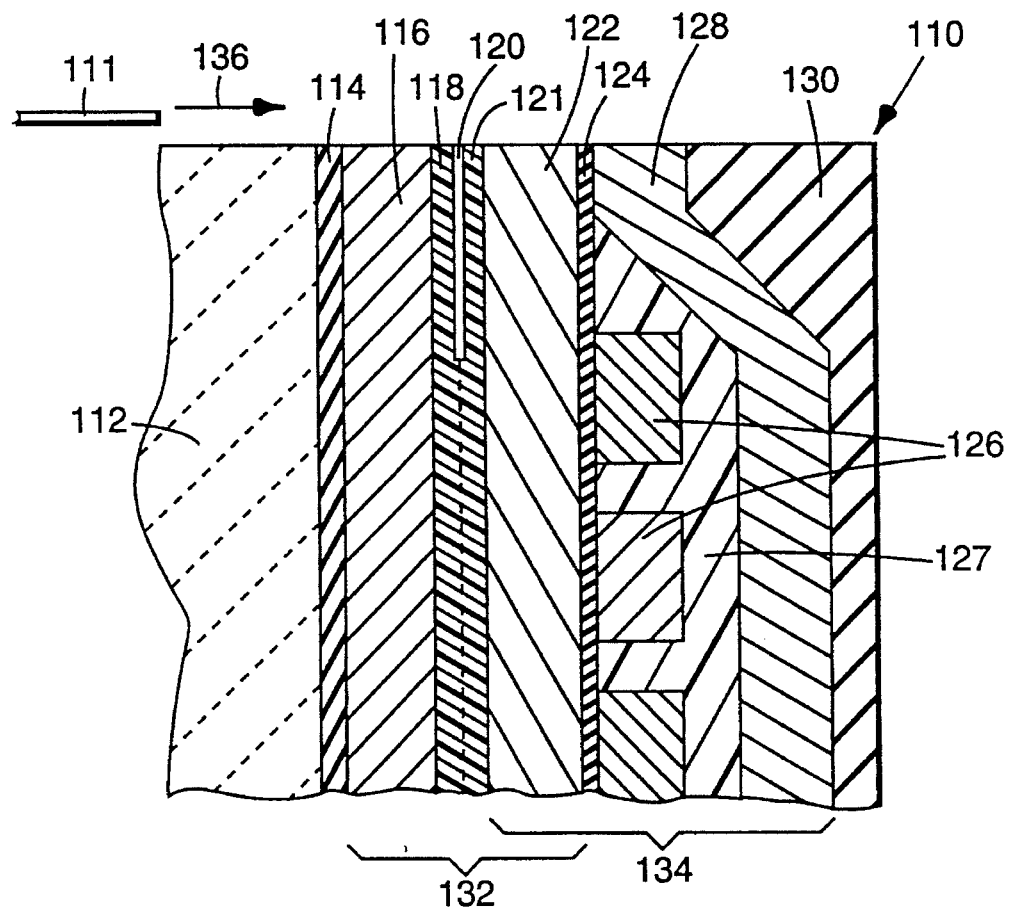
FIG. 5 is a cross-sectional side view of a thin-film magnetic head assembly according to another embodiment of the present invention.

The use of DLC as an insulator in a magnetic thin-film head assembly has utility wherever a layer of insulation is desired. A cross-sectional side view of a magnetic recording head assembly 110 according to another embodiment of the present invention is shown in FIG. 5. A magnetic media 111 moves past the top of the head assembly 110 in the direction of arrow 136. The head assembly 110 is comprised of a substrate 112, a first insulative layer 114, a bottom read shield 116, a second insulative layer 118, a magnetoresistive (MR) sensor 120, a third insulative layer 121, a top read shield/bottom write pole 122, a fourth insulative layer 124, a plurality of write coil turns 126, a smoothing layer 127, a top write pole 128, and a fifth insulative layer 130. The substrate 112 is preferably comprised of the same material as the substrate 52. The layers 116, 118, 120, 121, and 122 form a read head 132, and the layers 122, 124, 126, 127, and 128 form a write head 134. The insulative layers 114, 118, 121, 124, and 130 are comprised of DLC, such as amorphous hydrogenated carbon (a-C:H). Other materials may be used, such as amorphous carbon (a-C), ion beam-deposited carbon (i-C), or diamond or amorphous diamond.

The insulative layers 114, 118, 121, 124, and 130 are hard and have good electrically insulative characteristics, allowing the layers to be relatively thin. The thickness of the first insulative layer 114 is preferably within the range of from 10 nm to 10 µm, and more preferably less than about 1 µm; the second and third insulative layers 118 and 121 are each preferably within the range of from about 50 to 500 nm thick; the fourth insulative layer 127 is preferably within the range of from about 0.5 to 3 µm thick; and the fifth insulative layer 130 is preferably within the range of from about 0.5 to 5 µm thick. This reduction in width of the insulative layers decreases the size of the gap between the read and write functions of the head assembly, which reduces the area of the assembly that is susceptible to wear, thereby increasing the wear-resistance of the assembly. The reduction in the width of the insulative layers also reduces the distance between the read or write functions and the hard, protective substrate, thereby increasing the wear-resistance of the head assembly.

The use of diamond-like carbon in the insulating layers 114, 118, 121, 124, and 130 is also advantageous because it can be deposited in thin, pin-hole free layers (i.e., non-shorting) which allow for narrower gaps for better signal density response of the MR sensor 120 when placed between conductive, magnetic thin-film metal read shields 116 and 122 made up of NiFe (permalloy) or other soft magnetic films such as cobalt zirconium niobium (CZN) or cobalt zirconium tantalum (CZT). Despite being electrically non-conductive, DLC has a high coefficient of thermal conductivity which reduces the operating temperature of the MR sensor by conducting heat away from the sensor. This prolongs the life of the MR sensor, prevents damage to the magnetic media 111 when it is stopped over the sensor, and reduces tape running thermal noise. The high coefficient of thermal conductivity also minimizes stress in the electromagnetic circuitry during fabrication of a thin-film magnetic head, thereby improving reliability and process yields.

The present invention will now be further described by the following non-limiting examples.

EXAMPLE 1

A laminated base containing an amorphous hydrogenated diamond-like carbon film (a-C:H) provided on an $Al_2O_3$-TiC wafer was formed as follows. 3M Ceramic 210, which is an $Al_2O_3$-TiC wafer having a titanium carbide particle loading of 30% by weight, was cleaned using a cotton wipe dipped in ethanol and was then placed on the powered electrode of a Plasmatherm Model PD 2480 commercial parallel plate RF plasma reactor. The reactor was then pumped to a base pressure of 1 mTorr (0.13 Pascals) using a Roots blower backed by a mechanical pump.

The surface of the wafer was then further cleaned by an oxygen plasma etching step followed by an argon sputtering step. The oxygen etching step was carried out for five minutes at a pressure of 200 mTorr while maintaining the oxygen flow rate at 500 standard cubic centimeters per minute (sccm) and the DC bias voltage at 900 V.

The argon sputtering step was carried out for five minutes at a pressure of 50 mTorr while maintaining the argon flow rate at 200 sccm and the DC bias voltage at 1000 V. One minute before the completion of the argon sputtering step, the deposition of the a-Si:C:H layer was begun by introducing a tetramethylsilane vapor into the chamber at a flow rate of 50 sccm for two minutes. The pressure and voltage were maintained at 50 mTorr and 1000 V during the two minute a-Si:C:H deposition.

Thirty seconds before the completion of the a-Si:C:H deposition, and therefore about 30 seconds after the completion of the argon sputtering step, the DLC deposition process was begun. This thirty second overlap between the a-Si:C:H deposition and the DLC deposition facilitates a more gradual change in composition at the interface between the two thin films. The DLC deposition was carried out by using butadiene as the source gas and argon as the diluent gas. The flow rates of the argon and butadiene gases were fixed at 180 sccm and 20 sccm respectively, and the pressure and bias voltage were set at 50 mTorr and 1000 V. The DLC deposition was carried out for 25 minutes, yielding a DLC film thickness of 1.0 µm. The Mohs hardness of the resultant film was 9.

To demonstrate the effectiveness of the a-Si:C:H adhesion promoting layer, DLC films were deposited with and without the a-Si:C:H adhesion promoting layer on the same $Al_2O_3$-TiC wafer. This was done by masking a portion of the $Al_2O_3$-TiC wafer during the deposition run described above. A second deposition run was then performed on the same wafer by exposing the masked region using the procedure described above, except that the a-Si:C:H deposition step was omitted. The DLC tended to buckle and delaminate from the wafer wherever the DLC was deposited directly on the wafer without the benefit of the a-Si:C:H adhesion promoting layer.

Figure 4:
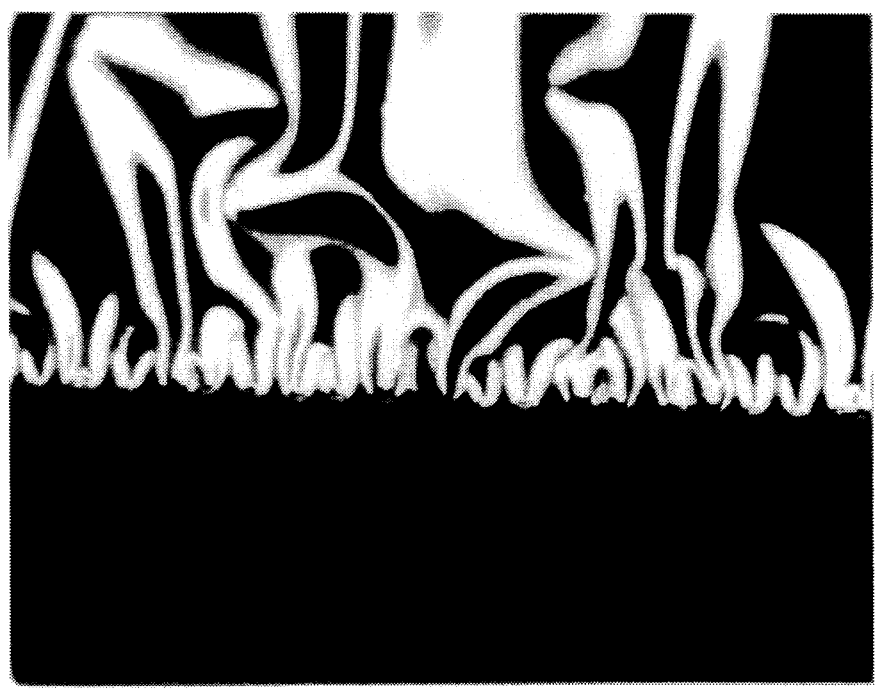
FIG. 4 is an optical micrograph showing the lack of delamination of a diamond-like carbon film deposited on a substrate according to the method of the present invention.

FIG. 4 shows an optical micrograph 100 of the a-Si:C:H prepared region 102. The buckling and delamination of the DLC film in the unprepared region 104 is clearly visible. The a-Si:C:H prepared region 102 experienced no appreciable buckling or delamination, as evidenced by the solid black color of the region 102.

To quantify the adhesion enhancement caused by the a-Si:C:H underlayer, several 0.5 µm thick DLC films were grown on $Al_2O_3$-TiC wafers both with and without the a-Si:C:H layer. Adhesion measurements were performed by mounting epoxy-bonded aluminum studs to the DLC films and carrying out tensile loading testing. The DLC films grown according to the above process did not fail at the greatest load that was tested, which was 10,320 psi ($7.3 \times 10^7$ $N/m^2$). The DLC films grown without the a-Si:C:H layer failed under a load of 4,946±254 psi ($3.5 \times 10^7$ $N/m^2$).

EXAMPLE 2

A second adhesion promoting layer was applied to the laminated base produced according to Example 1 by performing the following steps. An amorphous hydrogenated diamond-like carbon film (a-C:H) was deposited onto an $Al_2O_3$-TiC substrate by the method of the invention as described in the first four paragraphs of Example 1. Thirty seconds before the completion of the DLC deposition step, a-Si:H was deposited onto the DLC layer by introducing a 2% mixture of silane in argon into the reactor at a rate of 200 sccm. The pressure and DC bias voltage were maintained at 50 mTorr and 1000 V. The a-Si:H deposition was continued for two minutes, which yielded an a-Si:H film having a thickness believed to be within the preferred range of the invention, i.e., about 1 to 100 nm thick. At this point, multiple layers of electromagnetic circuitry could be deposited onto the a-Si:H layer to form a thin-film magnetic head.

Diamond-like carbon which has been covered with this second adhesion promoting layer will adhere well to various substances, including generally metals and alloys, and more specifically, electromagnetic circuitry.

We claim:

1. A laminated base for a thin-film magnetic head, including:

a ceramic substrate comprising titanium carbide particles dispersed in an alumina matrix;

an adhesion promoting layer of a-Si:C:H provided on and in contact with the substrate, wherein the adhesion promoting layer has a thickness within the range from about 10 to 100 nm; and an insulative, wear-resistant layer comprising diamond-like carbon provided on the adhesion promoting layer.

2. The laminated base of claim 1, further including a second adhesion promoting layer, comprising a-Si:H, provided on the wear-resistant layer.

3. The laminated base of claim 2, wherein the second adhesion promoting layer has a thickness within the range of from about 1 to 100 nm.

4. The laminated base of claim 2, further including electromagnetic circuitry deposited onto the second adhesion promoting layer, wherein the electromagnetic circuitry is configured to allow the laminated base to function as a thin-film magnetic head.

5. The laminated base of claim 1, wherein the wear-resistant layer is about 1 μm thick.

6. The laminated base of claim 1, further including a transition region interposed between the adhesion promoting layer and the wear-resistant layer, wherein the transition region is a blend of the two layers.

7. The laminated base of claim 1, wherein the wear-resistant layer in the laminated base has a Mohs hardness of about 9.

8. The laminated base of claim 1, wherein the titanium carbide particles dispersed in the alumina matrix have a particle loading within the range of from about 20 to 40% by weight.

9. A laminated base for a thin-film magnetic head, including:

a ceramic substrate comprising titanium carbide particles dispersed in an alumina matrix;

an adhesion promoting layer of a-Si:C or a-Si:C:H provided on and in contact with the substrate, wherein the adhesion promoting layer has a thickness within the range from about 10 to 100 nm; and an insulative, wear-resistant coating provided on the adhesion promoting layer, the coating comprising a material chosen from the group of diamond-like carbon, diamond and amorphous diamond.

10. The laminated base of claim 9, further including:

a second adhesion promoting layer comprising a-Si:H provided on the wear-resistant coating; and electromagnetic circuitry deposited onto the second adhesion promoting layer, wherein the electromagnetic circuitry is configured to allow the laminated base to function as a thin-film magnetic head.

11. The laminated base of claim 10, wherein the titanium carbide particles dispersed in the alumina matrix have a particle loading within the range of from about 20 to 40% by weight.

12. The laminated base of claim 9, wherein the water resistant layer is about 1 μm thick.

13. The laminated base of claim 9, further including a second adhesion promoting layer comprising a-Si:H provided on the wear-resistant coating on a side opposite the substrate.

\* \* \* \* \*